(12) United States Patent
Gonze et al.

(10) Patent No.: US 7,958,723 B2
(45) Date of Patent: Jun. 14, 2011

(54) ELECTRICALLY HEATED PARTICULATE FILTER PROPAGATION SUPPORT METHODS AND SYSTEMS

(75) Inventors: Eugene V. Gonze, Pinckney, MI (US); Michael J. Paratore, Jr., Howell, MI (US); Frank Ament, Troy, MI (US)

(73) Assignee: GM Global Technology Operations LLC

( * ) Notice: Subject to any disclaimer, the term of this patent is extended or adjusted under 35 U.S.C. 154(b) by 514 days.

(21) Appl. No.: 11/803,684

(22) Filed: May 15, 2007

(65) Prior Publication Data

US 2008/0282671 A1 Nov. 20, 2008

(51) Int. Cl.
*F01N 3/00* (2006.01)

(52) U.S. Cl. .......... 60/295; 60/274; 60/277; 60/286; 60/297; 60/300; 60/303

(58) Field of Classification Search ............ 60/274, 60/277, 295, 297, 300, 303, 311, 286; 55/DIG. 30, 55/523–528
See application file for complete search history.

(56) References Cited

U.S. PATENT DOCUMENTS

| | | | |
|---|---|---|---|
| 4,505,726 A | 3/1985 | Takeuchi | |
| 4,516,993 A | 5/1985 | Takeuchi | |
| 5,105,619 A * | 4/1992 | Arai | 60/286 |
| 5,711,149 A * | 1/1998 | Araki | 60/278 |
| 5,822,977 A * | 10/1998 | Fukuda et al. | 60/274 |
| 5,846,276 A * | 12/1998 | Nagai et al. | 55/523 |
| 6,021,639 A * | 2/2000 | Abe et al. | 60/297 |
| 6,233,927 B1* | 5/2001 | Hirota et al. | 60/297 |
| 6,245,306 B1* | 6/2001 | Miyazaki et al. | 423/215.5 |
| 6,574,956 B1* | 6/2003 | Moraal et al. | 60/295 |
| 6,770,116 B2* | 8/2004 | Kojima | 95/14 |
| 6,851,258 B2* | 2/2005 | Kawashima et al. | 60/311 |
| 6,854,265 B2* | 2/2005 | Saito et al. | 60/295 |
| 6,948,311 B2* | 9/2005 | Schaller et al. | 60/286 |
| 7,013,638 B2* | 3/2006 | Hiranuma et al. | 60/286 |
| 7,243,491 B2* | 7/2007 | Okugawa et al. | 60/311 |
| 7,340,886 B2* | 3/2008 | Kawashima et al. | 60/295 |
| 7,412,822 B2* | 8/2008 | Zhan et al. | 60/295 |
| 7,493,755 B2* | 2/2009 | Colignon | 60/295 |
| 7,607,290 B2* | 10/2009 | Matsuoka et al. | 60/286 |
| 2006/0179821 A1 | 8/2006 | Zhan et al. | |

FOREIGN PATENT DOCUMENTS

DE 102004000065 6/2006

* cited by examiner

*Primary Examiner* — Tu M Nguyen (57) ABSTRACT

A control system that controls regeneration of a particulate filter is provided. The system generally includes a regeneration module that controls current to the particulate filter to initiate combustion of particulate matter in the particulate filter. A propagation module estimates a propagation status of the combustion of the particulate matter based on a combustion temperature. A temperature adjustment module controls the combustion temperature by selectively increasing a temperature of exhaust that passes through the particulate filter.

21 Claims, 7 Drawing Sheets

ELECTRICALLY HEATED PARTICULATE FILTER PROPAGATION SUPPORT METHODS AND SYSTEMS

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust by a particulate filter (PF) that is disposed in the exhaust stream. Over time, the PF becomes full and the trapped diesel particulates must be removed. During regeneration, the diesel particulates are burned within the PF.

Some regeneration methods ignite the particulate matter present on the front of the PF via a front surface heater. Regeneration of the particulate matter present inside the PF is then achieved using the heat generated by combustion of particulate matter present near the heated face of the PF or by the heated exhaust passing through the PF. In some cases, high flow rates of exhaust passing through the PF extinguish the particulate matter combustion thus, stopping the propagation down the PF. To limit such extinguishment, operation of such regeneration methods is limited to drive conditions where exhaust flows are low, such as, idle conditions or city traffic drive conditions.

SUMMARY

Accordingly, a control system that controls regeneration of a particulate filter is provided. The system generally includes a regeneration module that controls current to the particulate filter to initiate combustion of particulate matter in the particulate filter. A propagation module estimates a propagation status of the combustion of the particulate matter based on a combustion temperature. A temperature adjustment module controls the combustion temperature by selectively increasing a temperature of exhaust that passes through the particulate filter.

In other features, a control method that controls regeneration of a particulate filter is provided. The method generally includes: initiating combustion of particulate matter in the particulate filter by controlling current to the particulate filter; estimating a propagation status of the combustion based on a combustion temperature; and selectively increasing the combustion temperature by controlling a temperature of exhaust that passes through the particulate filter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
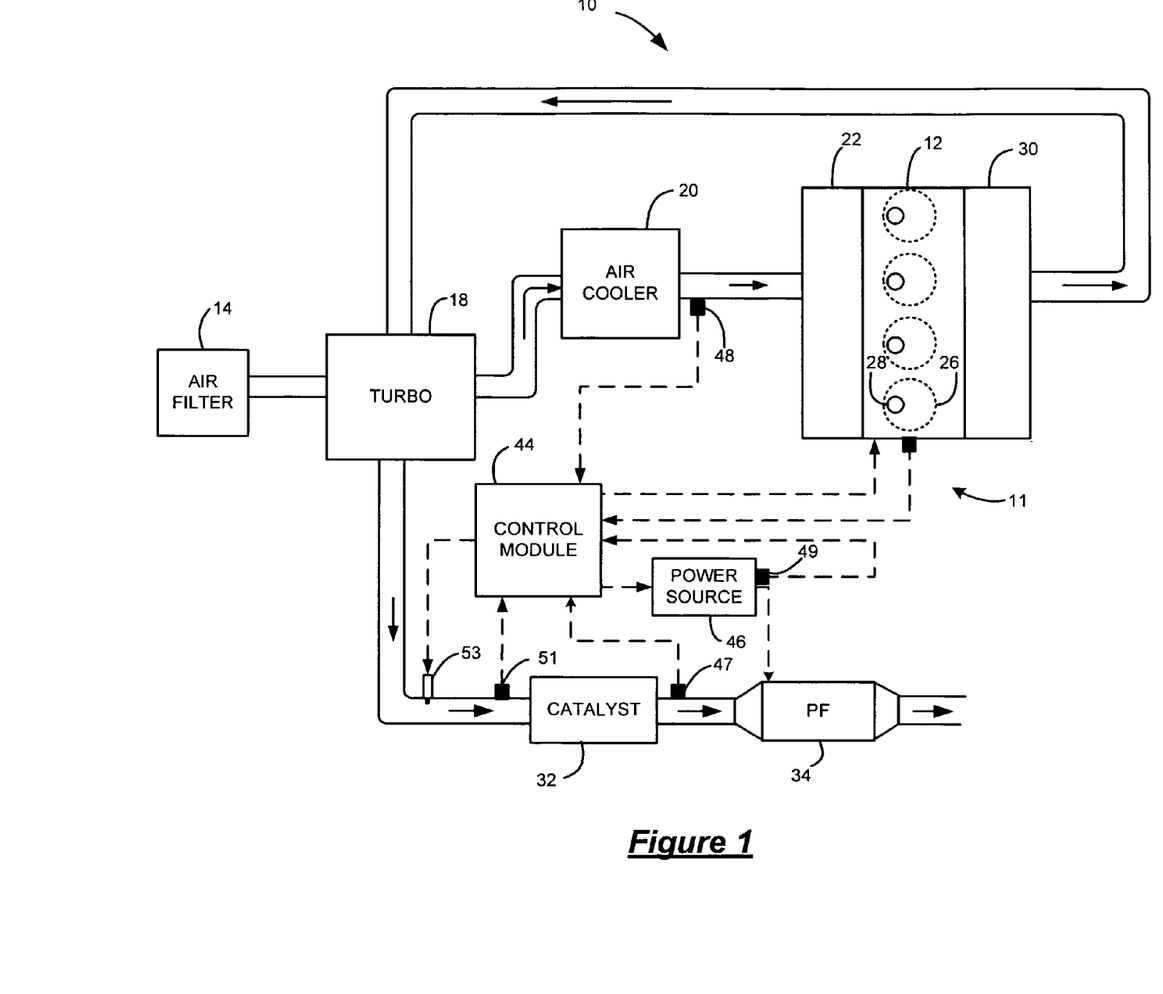
FIG. 1 is a functional block diagram of an exemplary vehicle including a particulate filter and a particulate filter propagation support system according to various aspects of the present disclosure.

Referring now to FIG. 1, an exemplary vehicle 10 including a diesel engine system 11 is illustrated in accordance with various aspects of the present disclosure. It is appreciated that the diesel engine system 11 is merely exemplary in nature and that the particulate filter propagation support system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 11 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 11. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. In various embodiments, a post fuel injector 53 injects fuel into the exhaust before entering the DOC 32. The amount of oxidation in the DOC 32 increases the temperature of the exhaust. The PF 34 receives exhaust from the DOC 32 and filters any particulate matter particulates present in the exhaust.

A control module 44 controls the engine 12 and PF regeneration based on various sensed and/or modeled information. More specifically, the control module 44 estimates particulate matter loading of the PF 34. When the estimated particulate matter loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 1-6 minutes. Current is only applied, however, during an initial portion of the regeneration process. More specifically, the electric energy heats the face of the PF 34 for a threshold period (e.g., 1-2 minutes). Exhaust passing through the front face is heated. The remainder of the regeneration process is achieved using the heat generated by combustion of the particulate matter present near the heated face of the PF 34 or by the heated exhaust passing through the PF 34.

In some cases, the combustion of the particulate matter present near the face of the PF 34 is extinguished by high flow rates of exhaust passing through the PF 34. The control module 44 maintains regeneration during the high flow rates based on the particulate filter propagation support methods and systems of the present disclosure. In addition, the control module 44 maintains the regeneration of the PF 34 based on one or more sensor signals received from the vehicle 10. In various embodiments, an exhaust temperature sensor 47 generates an exhaust temperature signal based on a temperature of the exhaust. A mass airflow sensor 48 generates an exhaust air signal based on air entering or exiting the engine 12. A current and/or voltage sensor 49 generates a current and/or voltage signal based on the voltage and/or current supplied by the power source 46 to the PF 34. An oxygen sensor 51 generates an oxygen level signal based on a level of oxygen in the exhaust. The control module 44 receives the signals and maintains the regeneration of the PF 34 by determining a status of the burning particulate matter and controlling one of the engine 12 and the post fuel injector 53 to increase the temperatures of the exhaust flow through the DOC 32.

Figure 2:
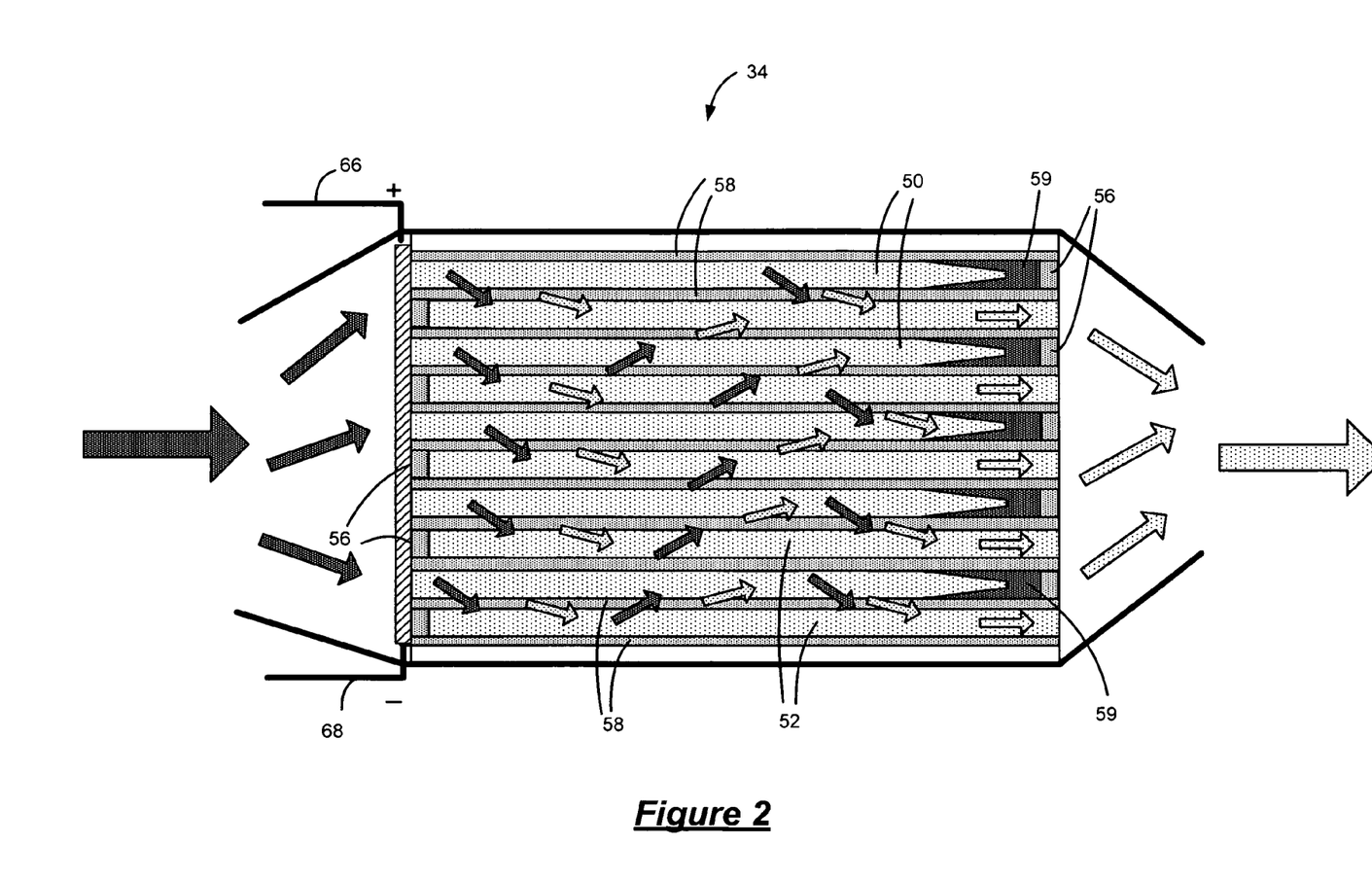
FIG. 2 is a cross-sectional view of an exemplary wall-flow monolith particulate filter.

With particular reference to FIG. 2, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present disclosure. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Particulate matter 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid 64 is composed of electrically resistive material such as stainless steel and attached to the PF 34 using an adhesive or press-fit to the PF 34.

Figure 3:
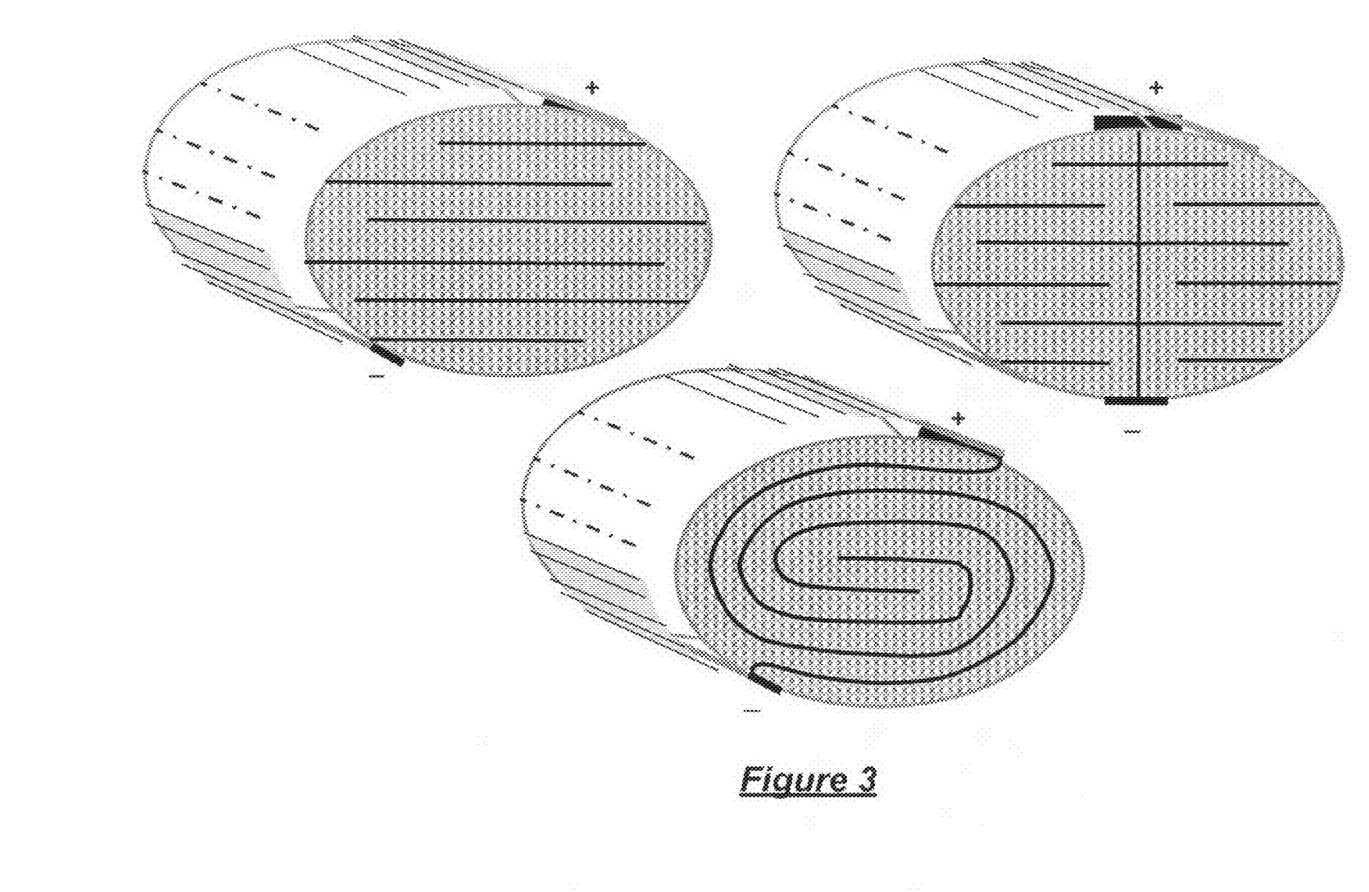
FIG. 3 includes perspective views of exemplary front faces of particulate filters illustrating various patterns of resistive paths.
Figure 4:
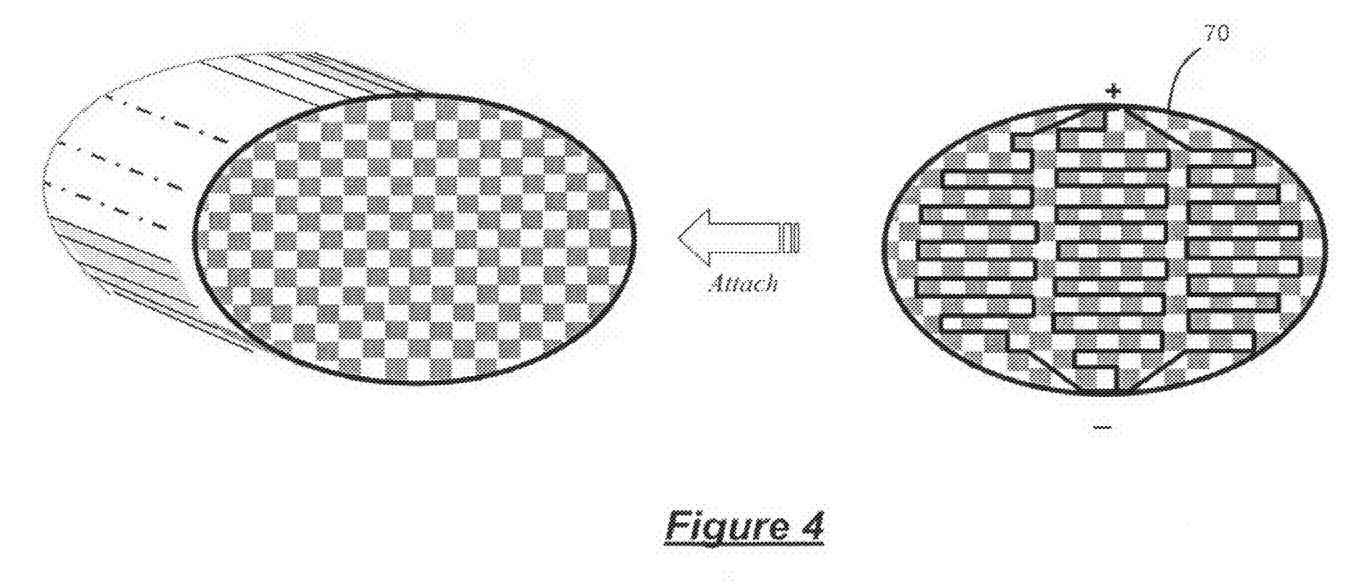
FIG. 4 is a perspective view of a front face of an exemplary particulate filter and a heater insert.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50, 52. The increased thermal energy ignites the particulate matter present near the inlet of the PF 34. The heat generated from the combustion of the particulates is then directed through the PF 34 to induce combustion of the remaining particulates within the PF 34.

Figure 5:
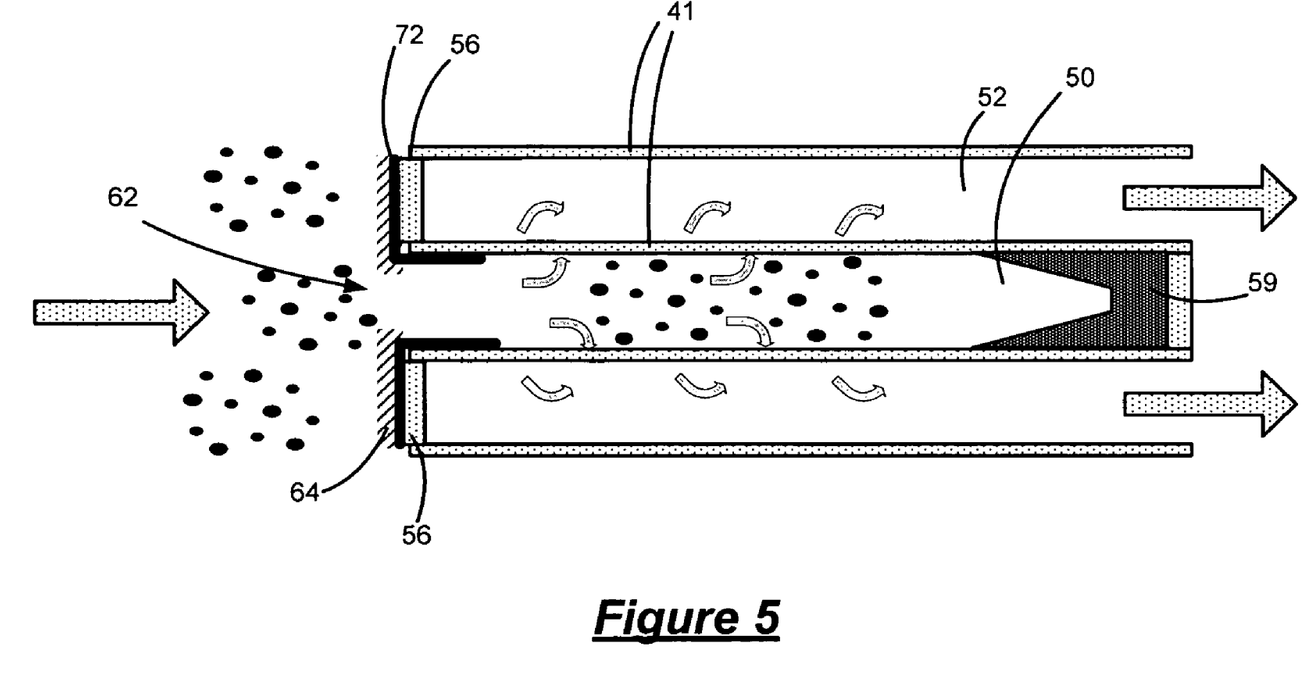
FIG. 5 is a cross-sectional view of a portion of the exemplary particulate filter of FIG. 2 including a conductive coating.

With particular reference to FIG. 5, a thermally conductive coating 72 can be additionally applied at the inlets 62 of the channels 50, 52. The coating 72 can extend a short distance down the opened ends of the closed channels 50. In various embodiments, the conductive coating extends within an inch of the front face of the PF 34. The resistive material of the grid 64 contacts the conductive coating 72. Thermal energy is transferred to the conductive coating 72 when electrical energy passes through the resistive material. Heat from the conductive coating 72 ignites the particulate matter present near the inlet of the PF 34.

Figure 6:
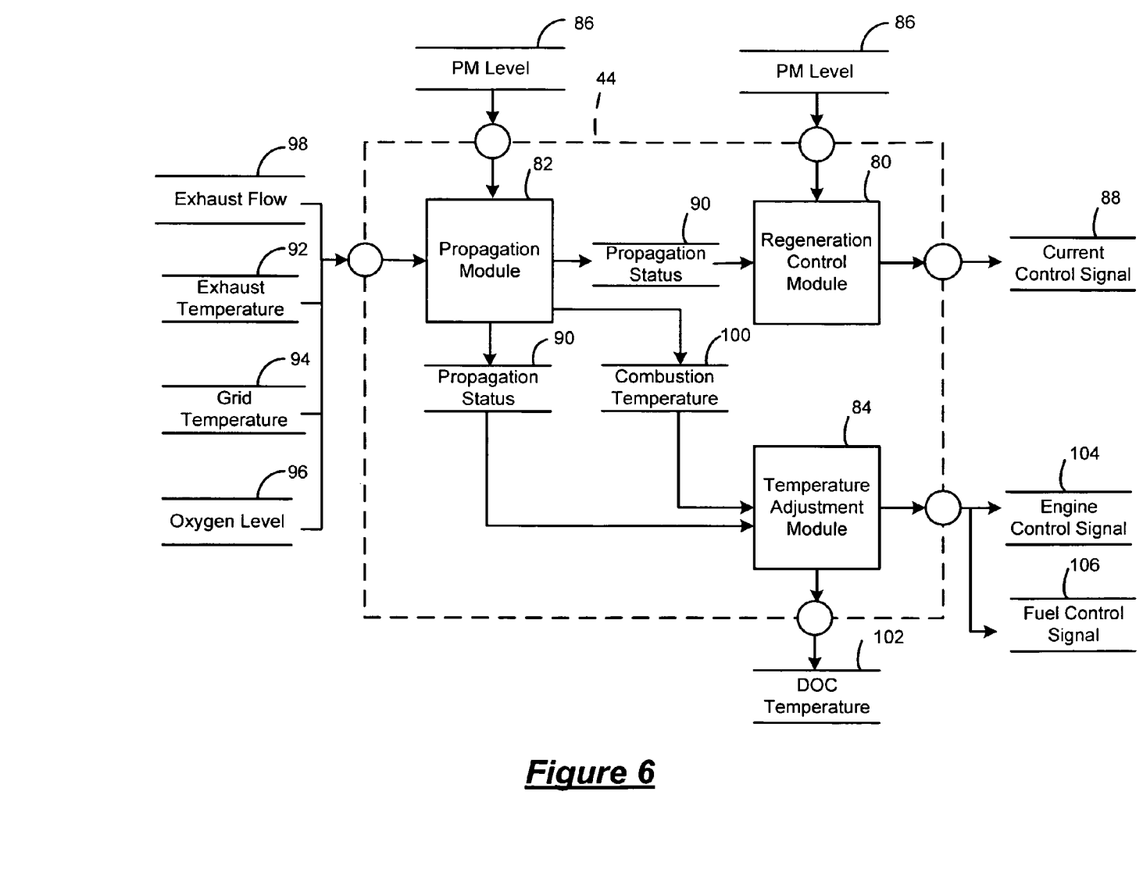
FIG. 6 is a dataflow diagram illustrating an exemplary particulate filter propagation support system according to various aspects of the present disclosure.

Referring now to FIG. 6, a dataflow diagram illustrates various embodiments of a particulate filter propagation support system that may be embedded within the control module 44. Various embodiments of particulate filter propagation support systems according to the present disclosure may include any number of sub-modules embedded within the control module 44. As can be appreciated, the sub-modules shown in FIG. 6 may be combined and/or further partitioned to similarly control regeneration of the PF 34. Inputs to the system may be sensed from the vehicle 10 (FIG. 1), received from other control modules (not shown) within the vehicle 10 (FIG. 1), and/or determined/modeled by other sub-modules (not shown) within the control module 44. In various embodiments, the control module 44 of FIG. 6 includes a regeneration module 80, a propagation module 82, and a temperature adjustment module 84.

The regeneration module 80 receives as input an estimation of the accumulated particulate matter in the PF 34 (FIG. 1), referred to as the particulate matter level 86. Based on the particulate matter level 86, the regeneration module 80 generates a current control signal 88 to control current to the PF 34 (FIG. 1) for initiating regeneration. The regeneration module 80 can also receive a propagation status 90 determined by the propagation module 82 as will be discussed further below.

The regeneration module 80 ceases the current control signal 88 once the propagation status 90 indicates propagation has begun.

The propagation module 82 receives as input an exhaust temperature 92, a grid temperature 94, an oxygen level 96, an exhaust flow 98, and the particulate matter level 86. Based on at least one of the exhaust temperature 92, the grid temperature 94, the particulate matter level 86, and the oxygen level 96, the propagation module 82 estimates a combustion temperature 100 of the particulate matter in the PF 34 (FIG. 1). Using the particulate matter combustion temperature 100 and the exhaust flow 98, the propagation module 82 determines the propagation status 90 of the combustion and thus, determines whether the combustion has extinguished. For example, if the regeneration has stalled, the propagation status 90 is set to TRUE. Otherwise, if the regeneration has completed, the propagation status 90 is set to FALSE.

The temperature adjustment module 84 receives as input the propagation status 90, the particulate matter combustion temperature 100, and a DOC temperature 102. Based on the propagation status 90, the temperature adjustment module 84 determines whether regeneration has completed. If regeneration has not completed and the particulate matter combustion temperature 100 indicates that the propagation is extinguishing, the temperature adjustment module 84 increases the temperature of exhaust flowing into the PF 34 (FIG. 1) based on the DOC temperature 102. For example, if the DOC temperature 102 is greater than an exothermic threshold, thermal assistance is provided by controlling the engine 12 (FIG. 1) to heat the DOC 32 (FIG. 1). If the DOC temperature 102 is less than the exothermic threshold, fuel assistance is provided to the PF 34 via the post fuel injector 53 or a rich pulse to the engine 12.

Figure 7:
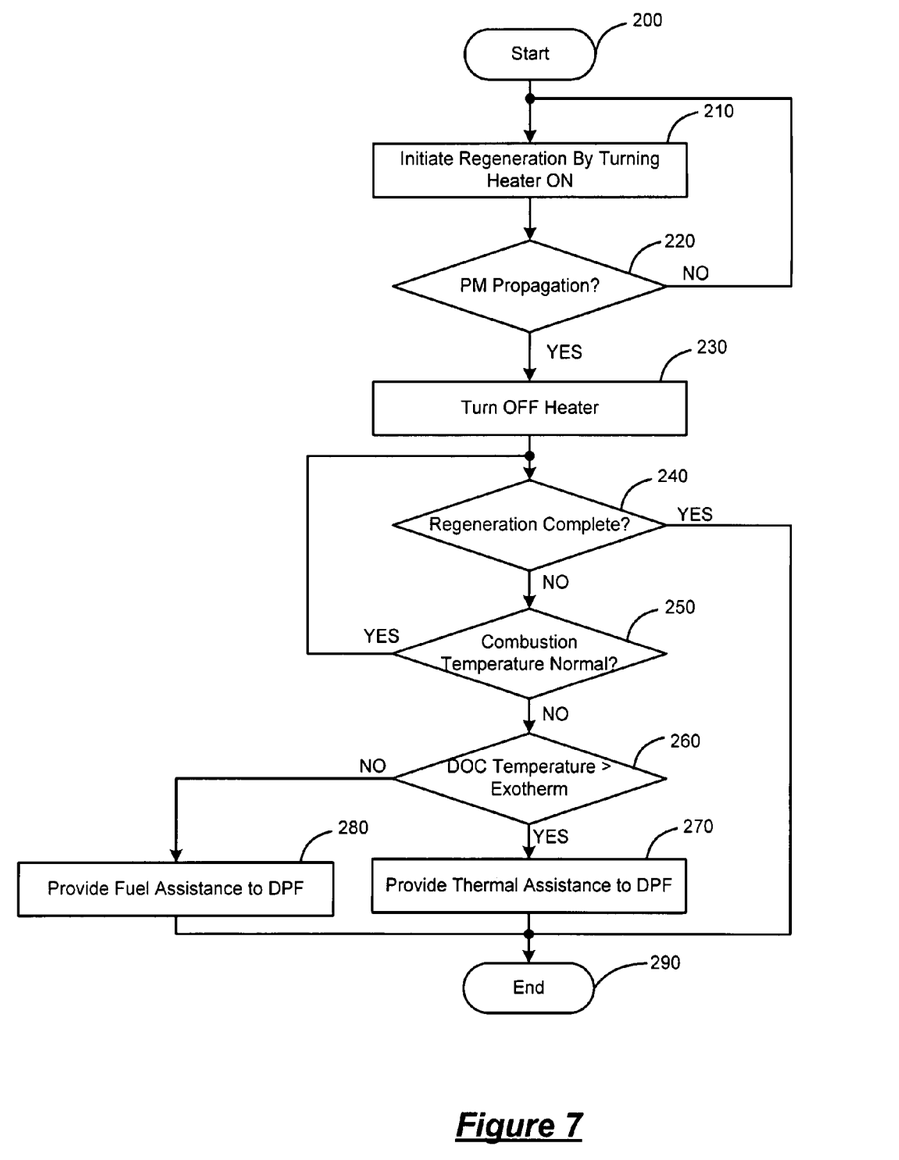
FIG. 7 is a flowchart illustrating an exemplary particulate filter propagation support method according to various aspects of the present disclosure.

Referring not to FIG. 7, a flowchart illustrates an exemplary particulate filter propagation support method that can be performed by the particulate propagation support system of FIG. 6 in accordance with various aspects of the present disclosure. As can be appreciated, the order of execution of the steps of the exemplary particulate filter propagation support method can vary without altering the spirit of the method. The exemplary particulate filter propagation support method may be performed periodically during control module operation or scheduled to run based on certain events.

In one example, the method may begin at 200. Regeneration is initiated by controlling current to the PF 34 (FIG. 1) at 210. The propagation status 90 of the burning particulate matter is evaluated at 220. If propagation status indicates that propagation has begun at 220, the current to the PF 34 (FIG. 1) is controlled off at 230. Otherwise, if the propagation status 90 indicates that propagation has not yet begun at 220, the method continues to control current to the PF 34 (FIG. 1) at 210.

Once the current to the FP 34 (FIG. 1) is turned off at 230 and if the regeneration is complete at 240, the method may end at 290. If, however, the regeneration is not complete at 240, the combustion temperature 100 is evaluated at 250. If the combustion temperature 100 is normal at 250, the method continues to monitor the propagation status 90 to determine whether the regeneration is complete at 240. Otherwise, if the combustion temperature 100 indicates that the combustion of the particulate matter is not normal, for example, higher temperatures of extinguishing combustion at 250, the DOC temperature 102 is evaluated at 260. If the DOC temperature 102 is greater than an exotherm threshold at 260, thermal assistance is provided to the PF 34 (FIG. 1) at 270. Otherwise if the DOC temperature 102 is less than the exotherm threshold at 260, fuel assistance is provided to the PF 34 (FIG. 1) at 280.

Thereafter, the method loops back and monitors the combustion temperature 100 at 250 until the combustion temperature 100 becomes normal and regeneration becomes complete at 230.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control method that controls regeneration of a particulate filter, comprising:
   initiating combustion of particulate matter in the particulate filter by controlling current to the particulate filter;
   estimating a propagation status of the combustion based on a combustion temperature;
   disabling the current when the propagation status indicates that propagation of the combustion has begun; and
   selectively increasing the combustion temperature by controlling a temperature of exhaust that passes through the particulate filter when the propagation status indicates that the combustion is extinguishing.

2. The method of claim 1 wherein the estimating further comprises estimating the propagation status based on the combustion temperature and a flow of the exhaust.

3. The method of claim 1 further comprising estimating the combustion temperature based on at least one of a level of the particulate matter in the particulate filter, a temperature of the exhaust, a temperature of the particulate filter, and a level of oxygen in the exhaust.

4. The method of claim 3 further comprising estimating the temperature of the particulate filter based on a temperature of a resistive grid of the particulate filter and wherein the temperature of the resistive grid is based on the current flowing to the resistive grid and a voltage supplied to the resistive grid.

5. The method of claim 1 further comprising increasing the temperature of the exhaust to increase the combustion temperature.

6. The method of claim 5 further comprising increasing the temperature of the exhaust by injecting fuel into the exhaust.

7. The method of claim 5 further comprising increasing the temperature of the exhaust by controlling combustion within an oxidation catalyst.

8. A control system that controls regeneration of a particulate filter, comprising:
   a regeneration module that controls current to the particulate filter to initiate combustion of particulate matter in the particulate filter;
   a propagation module that estimates a propagation status of the combustion of the particulate matter based on a combustion temperature,
   wherein the regeneration module disables the current when the propagation status indicates that propagation of the combustion has begun; and
   a temperature adjustment module that controls the combustion temperature by selectively increasing a temperature of exhaust that passes through the particulate filter when the propagation status indicates that the combustion is extinguishing.

9. The system of claim 8 wherein the temperature adjustment module further controls the temperature of the exhaust based on a temperature of an oxidation catalyst.

10. The system of claim 8 wherein the temperature adjustment module further controls the temperature of the exhaust by injecting fuel into the exhaust.

11. The system of claim 8 wherein the temperature adjustment module further controls the temperature of the exhaust by controlling combustion within an oxidation catalyst.

12. The system of claim 8 wherein the propagation module further estimates the propagation status based on the combustion temperature and a flow of the exhaust.

13. The system of claim 12 wherein the propagation module further estimates the combustion temperature based on at least one of a level of the particulate matter in the particulate filter, a temperature of the exhaust, a temperature of the particulate filter, and a level of oxygen in the exhaust.

14. The system of claim 13 wherein the temperature of the particulate filter is based on a temperature of a resistive grid of the particulate filter and wherein the temperature of the resistive grid of the particulate filter is based on the current flowing to the resistive grid and a voltage supplied to the resistive grid.

15. A vehicle, comprising:
a particulate filter that filters particulate matter from engine exhaust wherein an upstream end of the particulate filter receives the engine exhaust;
a grid of electrically resistive material that is applied to an exterior upstream surface of the particulate filter and that selectively heats exhaust passing through the grid to initiate combustion of the particulate matter within the particulate filter; and
a control module that initiates the combustion of the particulate matter by controlling current to the grid of the particulate filter, that estimates a propagation status of the combustion based on a combustion temperature, that disables the current when the propagation status indicates that propagation of the combustion has begun, and that increases the combustion temperature by controlling a temperature of the engine exhaust when the propagation status indicates that the combustion is extinguishing.

16. The vehicle of claim 15 wherein the control module increases the temperature of the engine exhaust to increase the combustion temperature.

17. The vehicle of claim 15 wherein the control module increases the temperature of the engine exhaust by injecting fuel into the engine exhaust.

18. The vehicle of claim 15 further comprising an oxidation catalyst and wherein the control module increases the temperature of the engine exhaust by controlling combustion within the oxidation catalyst.

19. The vehicle of claim 15 wherein the control module estimates the propagation status based on at least one of the combustion temperature and a flow of the engine exhaust.

20. The vehicle of claim 15 wherein the control module estimates the combustion temperature based on at least one of a level of the particulate matter in the particulate filter, a temperature of the engine exhaust, a temperature of the grid, and a level of oxygen in the engine exhaust.

21. The vehicle of claim 15 wherein the control module estimates a temperature of the grid based on the current flowing to the grid and a voltage supplied to the grid.

* * * * *